(12) United States Patent
Min et al.

(10) Patent No.: US 7,803,495 B2
(45) Date of Patent: Sep. 28, 2010

(54) POLYMER ELECTROLYTE MEMBRANE FOR FUEL CELL, METHOD FOR PREPARING THE SAME, AND FUEL CELL SYSTEM COMPRISING THE SAME

(75) Inventors: Myoung-Ki Min, Suwon-si (KR); Hye-A Kim, Yongin-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1085 days.

(21) Appl. No.: 11/341,933

(22) Filed: Jan. 26, 2006

(65) Prior Publication Data

US 2006/0166069 A1    Jul. 27, 2006

(30) Foreign Application Priority Data

Jan. 26, 2005    (KR)    ............... 10-2005-0007019

(51) Int. Cl.
*H01M 8/10*    (2006.01)
(52) U.S. Cl. .................... 429/492; 429/495
(58) Field of Classification Search ......... 429/12–46
See application file for complete search history.

(56) References Cited

U.S. PATENT DOCUMENTS

| | | | |
|---|---|---|---|
| 5,688,614 A * | 11/1997 | Li et al. ................ 429/310 |
| 5,766,787 A * | 6/1998 | Watanabe et al. ......... 429/33 |
| 5,795,668 A * | 8/1998 | Banerjee ................ 429/33 |
| 5,858,264 A | 1/1999 | Ichino et al. |
| 6,042,958 A | 3/2000 | Denton et al. |
| 6,248,469 B1 | 6/2001 | Formato et al. |
| 6,523,699 B1 | 2/2003 | Akita et al. |
| 6,635,384 B2 | 10/2003 | Bahar et al. |
| 6,764,783 B2 * | 7/2004 | Ronne et al. ............. 429/13 |
| 7,332,530 B2 | 2/2008 | Kiefer et al. |
| 2002/0106541 A1 * | 8/2002 | Yamada et al. ........... 429/21 |
| 2003/0099874 A1 * | 5/2003 | Kim et al. .............. 429/33 |
| 2003/0232184 A1 | 12/2003 | Morikawa et al. |
| 2004/0115498 A1 * | 6/2004 | McDonald et al. ........ 429/30 |
| 2004/0241531 A1 | 12/2004 | Biegert et al. |
| 2005/0100772 A1 | 5/2005 | Ono |

(Continued)

FOREIGN PATENT DOCUMENTS

CN    1332891 A    1/2002

(Continued)

OTHER PUBLICATIONS

Wan, Ying, Katherine AM Creber, Brant Peppley, V Tam Bui, and Ela Halliop. "New solid polymer electrolyte membranes for alkaline fuel cells." Polymer International 54.1 (2005): 5-10.*

(Continued)

*Primary Examiner*—Dah-Wei D Yuan
*Assistant Examiner*—Stephan Essex
(74) *Attorney, Agent, or Firm*—Christie, Parker & Hale, LLP

(57) ABSTRACT

The polymer electrolyte membrane for a fuel cell comprises a hygroscopic substrate and a proton conductive polymer disposed at the inside, one side, and/or both sides of the hygroscopic substrate.

14 Claims, 7 Drawing Sheets

U.S. PATENT DOCUMENTS

| | | |
|---|---|---|
| 2005/0158632 A1 | 7/2005 | Wang Chen et al. |
| 2005/0181275 A1 | 8/2005 | Jang |
| 2006/0003209 A1 | 1/2006 | Kim et al. |
| 2006/0029841 A1 | 2/2006 | Conrad et al. |

FOREIGN PATENT DOCUMENTS

| | | |
|---|---|---|
| CN | 1442913 A | 9/2003 |
| JP | 05-283094 | 10/1993 |
| JP | 06-029032 | 2/1994 |
| JP | 09-194609 | 7/1997 |
| JP | 2000-106202 | 4/2000 |
| JP | 2001-158806 | 6/2001 |
| JP | 2002-170580 | 6/2002 |
| JP | 2002-216803 | 8/2002 |
| JP | 2003-077492 | 3/2003 |
| JP | 2003-077494 | 3/2003 |
| JP | 2003-288915 | 10/2003 |
| JP | 2004-296409 | 10/2004 |
| JP | 2004-342424 | 12/2004 |
| JP | 2005-019285 | 1/2005 |
| JP | 2005-294167 | 10/2005 |
| WO | WO 03/026035 A2 | 3/2003 |

OTHER PUBLICATIONS

Chinese Office Action, and English translation, dated Nov. 16, 2007, for the related Chinese Patent Application No. 2005100813756, which discusses U.S. Patent 6,523,699 cited in Jan. 15, 2008 Information Disclosure Statement.

Patent Abstracts of Japan, Publication No. 2001-158806, dated Jun. 12, 2001, in the name of Koji Akita et al.

English language Abstracts of Japan, of JP 2003-077494, published Mar. 14, 2003, listed above.

Office action dated Jan. 2, 2008 for related U.S. Appl. No. 11/153,699, citing 6,635,384 and JP 2003-077494.

U.S. Office action dated Sep. 18, 2008, for related U.S. Appl. No. 11/155,859, indicating relevance of listed U.S. reference in this IDS.

Patent Abstracts of Japan, Publication No. 2000-106202, dated Apr. 11, 2000, in the name of Kazuhiro Yasuda et al.

Patent Abstracts of Japan, Publication No. 2003-288915, dated Oct. 10, 2003, in the name of Eiji Endo et al.

Patent Abstracts of Japan, Publication No. 2005-019285, dated Jan. 20, 2005, in the name of Satoru Watanabe et al.

Patent Abstracts of Japan, Publication No. 2005-294167, dated Oct. 20, 2005, in the name of Manabu Sugino.

* cited by examiner

US 7,803,495 B2

POLYMER ELECTROLYTE MEMBRANE FOR FUEL CELL, METHOD FOR PREPARING THE SAME, AND FUEL CELL SYSTEM COMPRISING THE SAME

CROSS-REFERENCE TO RELATED APPLICATION

This application claims priority to and the benefit of Korean Patent Application No. 10-2005-0007019 filed in the Korean Intellectual Property Office on Jan. 26, 2005, the entire content of which is incorporated herein by reference.

FIELD OF THE INVENTION

The present invention relates to a polymer electrolyte membrane for a fuel cell, a method for preparing the same, and a fuel cell system comprising the same. More particularly, the present invention relates to a polymer electrolyte membrane for a fuel cell having a self-humidifying function, a method for preparing the same, and a fuel cell system comprising the polymer electrolyte membrane.

BACKGROUND OF THE INVENTION

A fuel cell is a power generation system for producing electrical energy through an electrochemical redox reaction between oxygen and hydrogen included in a hydrocarbon-based material such as methanol, ethanol, natural gas, or the like.

A fuel cell may be categorized as a phosphoric acid type, a molten carbonate type, a solid oxide type, a polymer electrolyte type, or an alkaline type according to the kind of electrolyte used. These fuel cells operate on the same general principles, but differ from one another according to the kind of fuel used, the operating temperature, the catalyst used, and the electrolyte used.

Recently, polymer electrolyte membrane fuel cells (PEM-FCs) have been developed. They have excellent power output characteristics, low operating temperatures, and quick start and response characteristics compared to conventional fuel cells. Because of this, PEMFCs have a wide range of applications. Examples include mobile power sources for automobiles, distributed power sources for houses and public buildings, and small electric sources for electronic devices. A PEMFC system is essentially composed of a stack, a reformer, a fuel tank, and a fuel pump. The fuel pump provides fuel stored in the fuel tank to the reformer. The reformer reforms the fuel to generate hydrogen gas which is supplied to the stack where it is electrochemically reacted with oxygen to generate electrical energy.

Another type of fuel cell is a direct methanol fuel cell (DMFC), in which liquid methanol fuel is directly introduced to the stack. The DMFC might not include a reformer, which is essential for the polymer electrolyte fuel cell.

According to the fuel cell system described above, the stack in a fuel cell system generates electricity and has a stacked structure including several to tens of unit cells stacked therein. Each unit cell is composed of a membrane-electrode assembly (MEA) and two separators (or bipolar plates).

The MEA includes a polymer electrolyte membrane interposed between an anode (referred to as a fuel electrode or oxidation electrode) and a cathode (referred to as an air electrode or reduction electrode). The polymer electrolyte membrane includes a hydrogen ion conductive polymer.

The separators not only work as passageways for supplying the fuel required for the reaction to the anode and for supplying oxygen to the cathode, but also as conductors for serially connecting the anode and the cathode in the MEA. An electrochemical oxidation reaction of the fuel occurs at the anode, and an electrochemical reduction reaction of oxygen occurs at the cathode, thereby producing electricity, heat, and water due to the transfer of electrons generated during this process.

The polymer electrolyte membrane included in the MEA shows excellent proton conductivity when it includes a predetermined amount of moisture. A typical fuel cell is additionally equipped with a humidifier to maintain the polymer electrolyte membrane at a predetermined moisture level, and this makes the structure of the fuel cell complicated and keeps the fuel cell from being down-sized.

SUMMARY OF THE INVENTION

An exemplary embodiment of the present invention provides a polymer electrolyte membrane for a fuel cell having a self-humidifying function as well as excellent mechanical properties.

Another embodiment of the present invention provides a method of preparing the polymer electrolyte membrane.

Yet another embodiment of the present invention provides a fuel cell system including the polymer electrolyte membrane.

According to an embodiment of the present invention, a polymer electrolyte membrane for a fuel cell is provided which includes a hygroscopic substrate and a proton conductive polymer positioned at the inside and one or both sides of the hygroscopic substrate.

According to another embodiment of the present invention, a method for preparing a polymer electrolyte membrane for a fuel cell is provided, which includes a) coating one side or both sides of a hygroscopic substrate with a proton conductive polymer solution, and b) drying the proton conductive polymer solution.

According to another embodiment of the present invention, a fuel cell system is provided, which includes a) an electricity generating element, b) a fuel supplier, and c) an oxidant supplier. The electricity generating element includes i) a membrane-electrode assembly (MEA) that includes a polymer electrolyte membrane for a fuel cell with a cathode disposed on one side of the polymer electrolyte membrane and an anode disposed on the other side of the of the polymer electrolyte membrane, and ii) separators disposed to contact the anode and cathode of the membrane-electrode assembly.

DETAILED DESCRIPTION

According to one embodiment of the invention, a polymer electrolyte membrane for a fuel cell includes a hygroscopic substrate with a proton conductive polymer. The proton conductive polymer may be provided inside the hygroscopic substrate, and/or on one side or both sides of the hygroscopic substrate.

The hygroscopic substrate included in the polymer electrolyte membrane for a fuel cell may be hydrophilic or both hydrophilic and conductive at its surface.

When the polymer electrolyte membrane includes the proton conductive polymer at both sides or at both sides and inside of the hygroscopic substrate, it is preferred to treat the hygroscopic substrate to be hydrophilic.

When the polymer electrolyte membrane includes the proton conductive polymer at the inside and/or one side of the hygroscopic substrate, it is preferred to treat the hygroscopic substrate to be both hydrophilic and conductive. In one embodiment, the conductive side does not include the proton conductive polymer.

Figure 1:
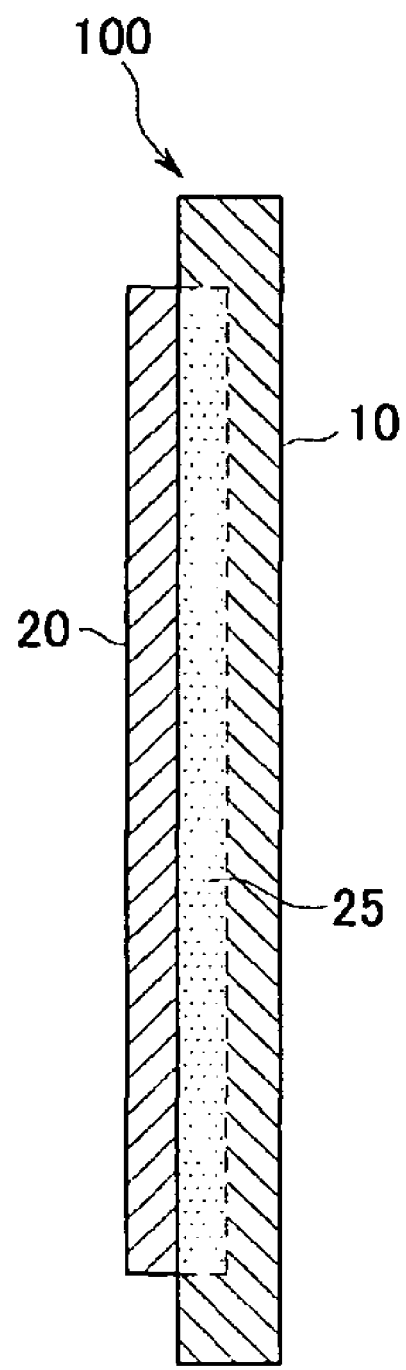
FIG. 1 is a cross-sectional view of a polymer electrolyte membrane in accordance with an embodiment of the present invention.

FIG. 1 shows a cross-sectional view of a polymer electrolyte membrane 100 including a proton conductive polymer 20 both at an inside portion 25, and at one side of the hygroscopic substrate 10. Preferably, the proton conductive polymer is provided as a membrane disposed on one side of the polymer electrolyte membrane 100, and the hygroscopic substrate is disposed to contact an anode in preparing a membrane-electrode assembly (MEA) for a fuel cell. More preferably, the surface of the hygroscopic substrate contacting the anode is hydrophilic and conductive.

Figure 2:
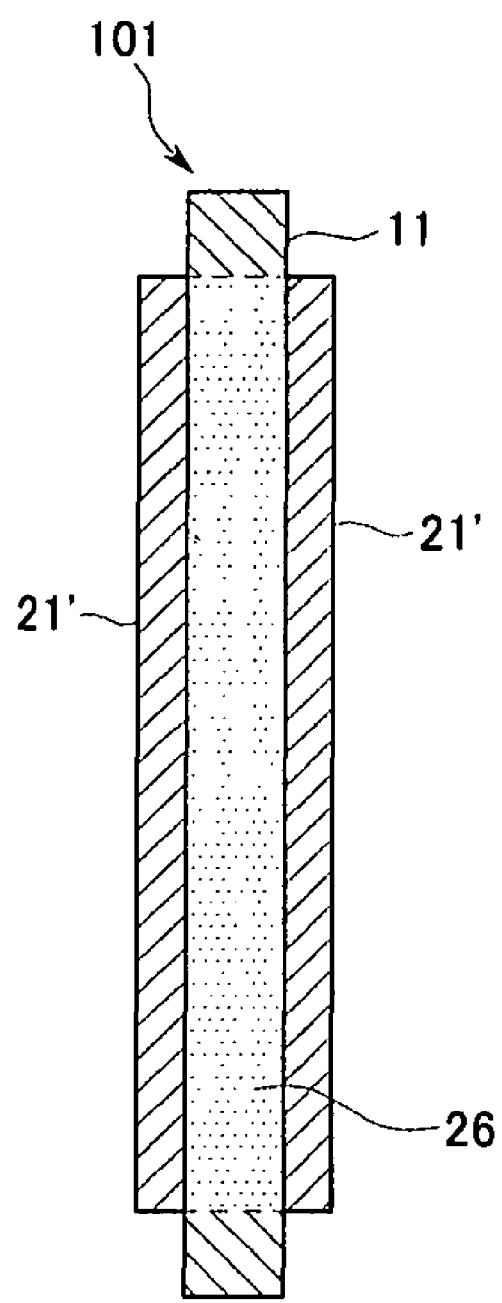
FIG. 2 is a cross-sectional view of a polymer electrolyte membrane in accordance with another embodiment of the present invention.

FIG. 2 shows a polymer electrolyte membrane 101 including proton conductive polymers 21 and 21' at the inside 26 and at both sides of the hygroscopic substrate 11. According to this embodiment, the conductive polymers may be provided as membranes disposed on both sides, and the proton conductive polymer membrane contacting the anode is thinner than the other proton conductive polymer membrane of the MEA.

When the polymer electrolyte membrane includes the proton conductive polymers on both sides of the hygroscopic substrate, the proton conductive polymers on both sides may be of the same kind or different kinds. When the proton conductive polymers are of different kinds, they can be applied to a Direct Methanol Fuel Cell (DMFC) to decrease fuel cross-over.

The hygroscopic substrate of the polymer electrolyte membrane may have a thickness from 10 to 200 μm, and more preferably, it has a thickness from 15 to 50 μm. When the hygroscopic substrate is thinner than 10 μm, there may be problems with its physical stability, and when it is thicker than 200 μm, the proton conductivity of the polymer electrolyte membrane may be degraded and the weight and volume of the fuel cell are increased.

The hygroscopic substrate may be a woven fabric, a porous film, or a non-woven fabric that includes a hydrophilic compound with excellent hygroscopic properties, and may also have excellent physical strength. The hygroscopic substrate may include at least one hydrophilic compound selected from the group consisting of polyvinyl alcohol (PVA), salts of alkynic acids such as sodium salts of alkynic acids, chitosan, and combinations thereof. However, the hygroscopic substrate of the present invention is not specifically limited to such materials and the kinds of hydrophilic compound included in the hygroscopic substrate are not limited to the above-mentioned examples.

The hygroscopic substrate may have a porosity greater than or equal to 60%, with a preferred porosity from 60% to 90%, and a more preferred porosity from 70% to 85%. When the porosity is less than 60%, the proton conductivity of the polymer electrolyte membrane may be reduced.

The hygroscopic substrate may further include a hygroscopic agent to enhance the hygroscopic effect. The hygroscopic agent is a hydrophilic material with excellent moisture absorption properties, and it helps the water generated from the operation of a fuel cell to diffuse into the inside of the polymer electrolyte membrane. Suitable hygroscopic agents include one or more inorganic oxides selected from the group consisting of zeolite, inorganic silicate, $TiO_2$, $SiO_2$, and $RuO_2$. Non-limiting examples of inorganic silicates include pyrophylite-talc, montmorillonite (MMT), fluorohectorite, kaolinite, vermiculite, illite, mica, or brittle mica. However, the hygroscopic agent used in the present invention is not limited to the above-mentioned examples.

The amount of hygroscopic agent may be from 1 to 50 parts by weight of the hygroscopic agent, and preferably, from 10 to 20 parts by weight based on 100 parts by weight of the hygroscopic substrate. When less than 1 part by weight of the hygroscopic agent is provided, the hygroscopic effect is insignificant, and when more than 50 parts by weight are provided, the stability of the proton conductive polymer is degraded and thus the proton conductivity and mechanical strength may be deteriorated.

When the hygroscopic substrate includes the proton conductive polymer at only one side, the hygroscopic substrate should be treated to be hydrophilic and conductive. The electroconductivity and the hygroscopic property are imparted by treating the side of the hygroscopic substrate toward the cathode with the proton conductive polymer, and treating the side toward the anode to be conductive.

The hygroscopic substrate may be made conductive by coating it with electroconductive nano particles. The nano particles may be electroconductive nano metal particles or nano carbon particles. Examples of nano metal particles include platinum, ruthenium, gold, and silver, and preferred materials are stable in acidic conditions.

The hygroscopic substrate may include from 1 to 15 parts by weight of the electroconductive nano particles based on the 100 parts by weight of the hygroscopic substrate. When less than 1 part by weight of the conductive nano particles are provided, the hygroscopic effect is insignificant, and when more than 15 parts by weight of the electroconductive nano particles are provided, the proton conductivity may be degraded.

The proton conductive polymer included in the polymer electrolyte membrane acts to transfer the protons generated at the anode of the MEA to the cathode. The proton conductive polymer may have excellent proton conductivity. The proton conductive polymer membrane positioned at one side or both sides of the hygroscopic substrate may have a thickness of less than 50 μm, and preferably has a thickness from 1 to 25 μm.

When the proton conductive polymer membrane positioned at one side or both sides of the hygroscopic substrate has a thickness of 0 μm, it signifies that the hygroscopic substrate includes the proton conductive polymer inside it. When the proton conductive polymer membrane is thicker than 50 μm, the polymer electrolyte membrane becomes so thick that the proton conductivity is degraded.

Exemplary proton conductive polymers include perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof. In one embodiment, the proton conducive polymer includes at least one of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly (2,5-benzimidazole). However, the proton conductive polymer included in the polymer electrolyte membrane for a fuel cell is not limited by the above-mentioned examples.

The thickness of the polymer electrolyte membrane including the thickness of the hygroscopic substrate and the thickness of the proton conductive polymer membrane may be from 10 to 300 μm, and is preferably from 15 to 100 μm. When the polymer electrolyte membrane is thinner than 10 μm, there may be a problem in the stability of the polymer electrolyte membrane, and when it is thicker than 300 μm, the proton conductivity is deteriorated and the fuel cell becomes heavy and large.

The hygroscopic substrate may further include a catalyst for a fuel cell. The catalyst allows the hygroscopic substrate to be self-humidified by producing water through a reaction between hydrogen and oxygen in the fuel cell.

Exemplary catalysts include platinum, ruthenium, osmium, platinum-ruthenium alloys, platinum-osmium alloys, platinum-palladium alloys, platinum-M alloys and combinations thereof, where M is at least one metal selected from the group consisting of Ga, Ti, V, Cr, Mn, Fe, Co, Ni, Cu, Zn, and combinations thereof. In one embodiment, the catalyst is at least one selected from the group consisting of platinum, ruthenium, osmium, platinum-ruthenium alloys, platinum-osmium alloys, platinum-palladium alloys, platinum-cobalt alloys, and platinum-nickel alloys.

In one embodiment, the amount of the catalyst is from 1 to 20 parts by weight, and preferably includes from 1 to 5 parts by weight based on 100 parts by weight of the hygroscopic substrate. When the content of the catalyst is less than 1 part by weight, the effect of the catalyst addition is insignificant, and when it is more than 20 parts by weight, the increased catalyst costs become prohibitively expensive.

The polymer electrolyte membrane can be applied to either a polymer electrolyte membrane fuel cell (PEMFC) or a direct methanol fuel cell (DMFC), and such polymer electrolyte membranes exhibit excellent performance under both non-humidifying conditions and humidifying conditions.

Figure 3:
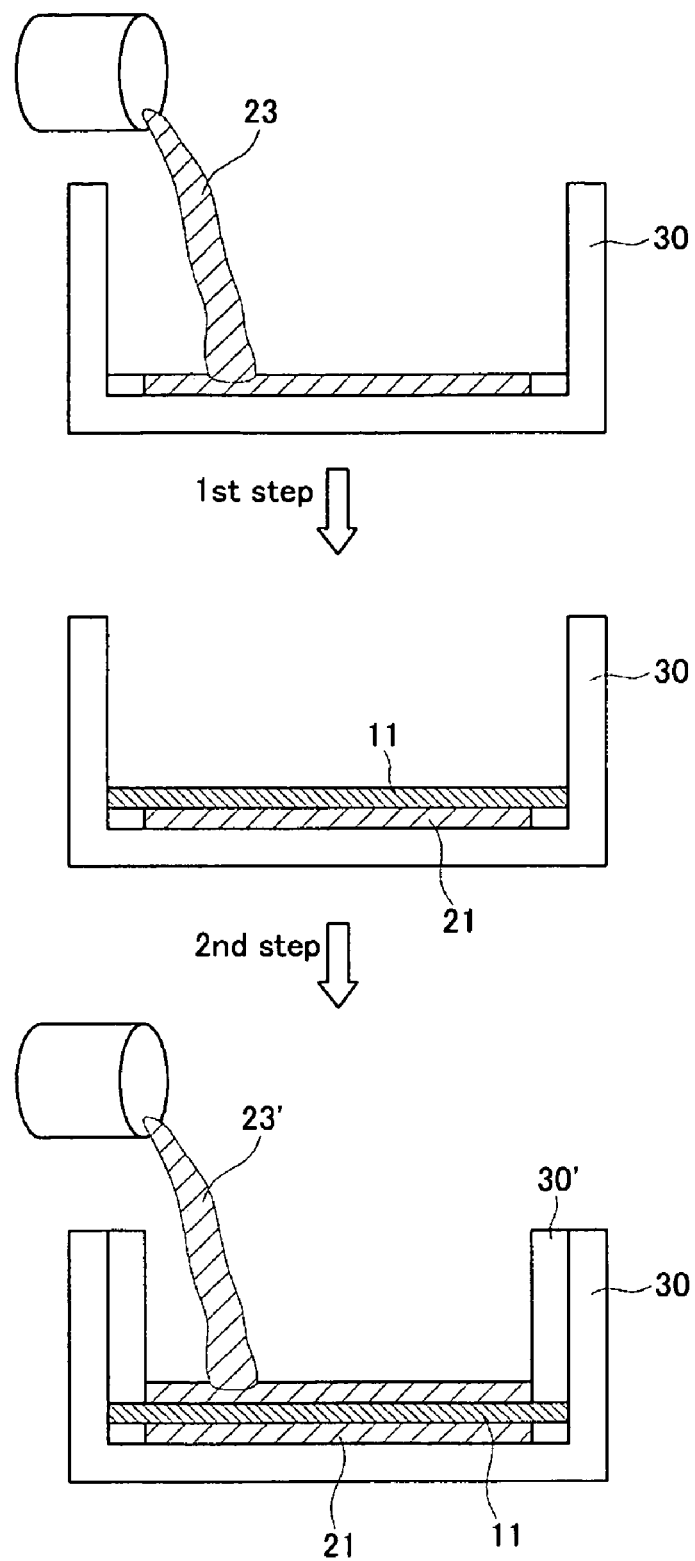
FIG. 3 schematically illustrates a process for directly forming a proton conductive polymer membrane in accordance with an embodiment of the present invention.

The polymer electrolyte membrane for a fuel cell can be prepared by filling the inside of the hygroscopic substrate with a proton conductive polymer solution or by directly forming the proton conductive polymer membrane on one side or both sides of the hygroscopic substrate. FIG. 3 illustrates a method for preparing a polymer electrolyte membrane for a fuel cell in accordance with an embodiment of the present invention.

As shown in FIG. 3, in the first step, a mold frame 30 is filled with a proton conductive polymer solution 23, and the hygroscopic substrate 11 is disposed thereon.

In the second step, a mold frame 30' is mounted on top of the hygroscopic substrate and the hygroscopic substrate is coated with a proton conductive polymer solution 23'.

The proton conductive polymer solution 23 used in the first step and the proton conductive polymer solution 23' used in the second step may be the same or different from each other.

Then, the proton conductive polymer solution is dried to thereby form the polymer electrolyte membrane including the proton conductive polymer at the inside and both sides of the hygroscopic substrate.

It is also possible to form the polymer electrolyte membrane including the proton conductive polymer at the inside and on one side of the hygroscopic substrate by coating the hygroscopic substrate with the proton conductive polymer solution through the first and second steps and then performing the drying process.

Also, the polymer electrolyte membrane for a fuel cell may be prepared by using the proton conductive polymer solution and adhering a proton conductive polymer membrane to one side or both sides of the hygroscopic substrate.

Figure 4A:
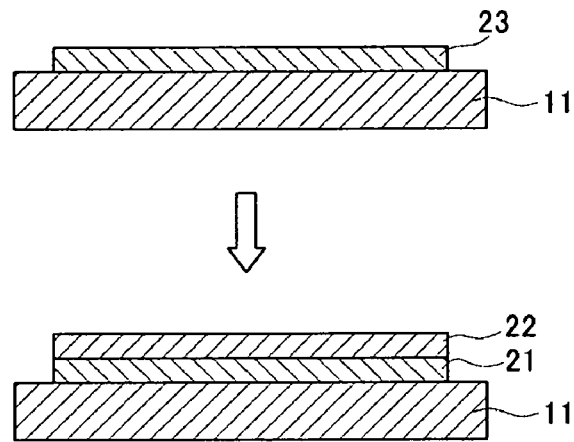
FIGS. 4A and 4B schematically illustrate processes for adhering proton conductive polymer membranes to hygroscopic substrates in accordance with certain embodiments of the present invention.
Figure 4B:
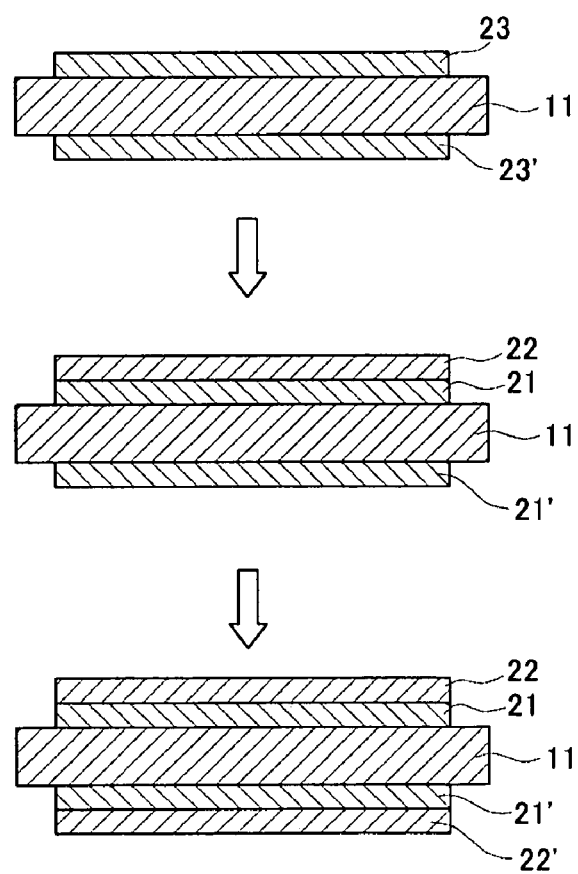

FIGS. 4A and 4B illustrate a process of adhering a proton conductive polymer membrane to one side or both sides of the hygroscopic substrate by using a proton conductive polymer solution in accordance with another embodiment of the present invention.

As illustrated in FIGS. 4A and 4B, a polymer electrolyte membrane including the proton conductive polymer membrane at one side or both sides of the hygroscopic substrate can be prepared by coating one or both sides of the hygroscopic substrate 11 with the proton conductive polymer solutions 23 and 23', adhering the proton conductive polymer membranes 22 and 22' thereto, and drying.

As shown in FIG. 4B, it is possible to adhere the proton conductive polymer membrane 22 to one side of the hygroscopic substrate 11, and to coat the other side of the hygroscopic substrate 11 with the proton conductive polymer solution 23'. The construction may then be dried to form the proton conductive polymer membrane.

Herein, the proton conductive polymer membranes 22 and 22' and the proton conductive polymer solutions 23 and 23', which are used to prepare the polymer electrolyte membrane for a fuel cell may include the same proton conductive polymer or different proton conductive polymers.

The hygroscopic substrate used for the preparation of the polymer electrolyte membrane that is disclosed in the present invention may be a woven fabric, a porous film, or a non-woven fabric that includes a hydrophilic compound with excellent hygroscopic properties, and may also have excellent physical strength.

The hygroscopic substrate may include at least one hydrophilic compound selected from the group consisting of polyvinylalcohol (PVA), salts of alkynic acids such as sodium salts of alkynic acids, chitosan, and combinations thereof.

The hygroscopic substrate may have a thickness from 10 to 200 μm, and preferably has a thickness from 15 to 50 μm.

The hygroscopic substrate may further include a hygroscopic agent to enhance the hygroscopic effect. The hygroscopic agent may be a hydrophilic material with excellent moisture absorption properties, and may help the water generated from the operation of a fuel cell to diffuse into the inside of the polymer electrolyte membrane.

Exemplary hygroscopic agents include inorganic oxides selected from the group consisting of zeolites, inorganic silicates, $TiO_2$, $SiO_2$, $RuO_2$, and combinations thereof. However, the hygroscopic agents used in the present invention are not limited to the above-mentioned examples.

The hygroscopic agent may be included in the hygroscopic substrate by being sprayed thereto. The amount of the hygroscopic agent may be 1 to 50 parts by weight of the hygroscopic agent, and preferably, from 10 to 20 parts by weight based on 100 parts by weight of the hygroscopic substrate. The hygroscopic substrate may further include a catalyst for a fuel cell. The catalyst for a fuel cell helps generate water inside the polymer electrolyte membrane through a chemical reaction between hydrogen and oxygen in order to self-humidify the polymer electrolyte membrane.

The catalyst for a fuel cell may be included in the hygroscopic substrate by being sprayed thereto. Exemplary catalysts for a fuel cell include platinum, ruthenium, osmium, platinum-ruthenium alloys, platinum-osmium alloys, platinum-palladium alloys, platinum-M alloys, and combinations thereof where M is at least one transition metal selected from the group consisting of Ga, Ti, V, Cr, Mn, Fe, Co, Ni, Cu, Zn, and combinations thereof. In one embodiment, the catalyst is selected from the group consisting of platinum, ruthenium, osmium, platinum-ruthenium alloys, platinum-osmium alloys, platinum-palladium alloys, platinum-cobalt alloys, and platinum-nickel alloys.

The catalyst may be provided in an amount from 1 to 20 parts by weight based on 100 parts by weight of the hygroscopic substrate, and may preferably be provided in an amount from 1 to 5 parts by weight.

The proton conductive polymer membrane is formed to have a thickness of less than 50 μm at one or both sides of the hygroscopic substrate, preferably has a thickness from 1 to 50 μm, and more preferably has a thickness from 1 to 25 μm. When the proton conductive polymer membrane has a thickness of 0 μm, it signifies that only the hygroscopic substrate includes the proton conductive polymer inside it. When the proton conductive polymer is thicker than 50 μm, the entire thickness of the polymer electrolyte membrane becomes so thick that the proton conductivity is deteriorated.

When the proton conductive polymer membrane is formed at only one side of the hygroscopic substrate, the hygroscopic substrate should be treated to be hydrophilic and conductive. The side of the hygroscopic substrate toward the cathode is treated with the proton conductive polymer and the other side toward the anode is treated to be electroconductive so that the hygroscopic substrate can have electroconductivity and hygroscopic properties.

The hygroscopic substrate may be coated with electroconductive nano particles to obtain the electroconductivity. For example, the hygroscopic substrate may be sprayed with nano particles to be made electroconductive.

The nano particles may be electroconductive nano metal particles or nano carbon particles. Exemplary nano metal particles include platinum, ruthenium, gold, and silver. Preferred nano metal particles are stable in acidic conditions. The electroconductive nano particles may provided in an amount from 1 to 15 parts by weight based on 100 parts by weight of the hygroscopic substrate.

Exemplary proton conductive polymer solutions and proton conductive polymer membranes used for the preparation of the polymer electrolyte membrane for a fuel cell include perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof. Preferred materials include poly (perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly (2,5-benzimidazole). However, the kinds of the proton conductive polymer solutions and the proton conductive polymer membranes which are used for the preparation of the polymer electrolyte membrane for a fuel cell are not limited to the above-mentioned examples.

The thickness of the polymer electrolyte membrane including the thickness of the hygroscopic substrate and the thickness of the proton conductive polymer membrane is from 10 to 300 μm, and a preferred thickness is from 15 to 100 μM. When the polymer electrolyte membrane for a fuel cell is thinner than 10 μm, there may be a problem with the stability thereof, and when it is thicker than 300 μm, the proton conductivity may be degraded and the fuel cell becomes heavy and large.

The polymer electrolyte membrane for a fuel cell, which is prepared according to the above-described method absorbs water generated in the fuel cell and humidifies the fuel cell, while exhibiting excellent physical strength.

Figure 5:
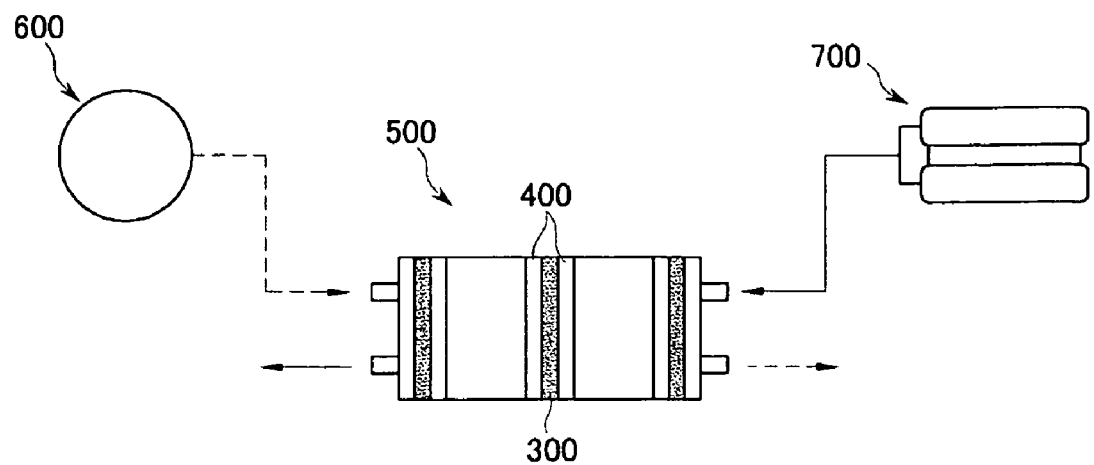
FIG. 5 schematically illustrates a fuel cell system in accordance with an embodiment of the present invention.

FIG. 5 shows a fuel cell system in accordance with one embodiment of the present invention. FIG. 5 illustrates a fuel cell system wherein a fuel and an oxidant are provided to the electricity generating element through pumps, but the present invention is not limited to such structures. It is obvious to those skilled in the art that the fuel cell system of the present invention may adopt a structure where a fuel and an oxidant are provided in a diffusion manner.

Referring to FIG. 5, the fuel cell system of the present invention includes an electricity generating element 500, a fuel supplier 600, and an oxidant supplier 700. The electricity generating element 500 includes a membrane-electrode assembly 300, and separators 400 positioned on both sides of the membrane-electrode assembly 300.

Figure 6:
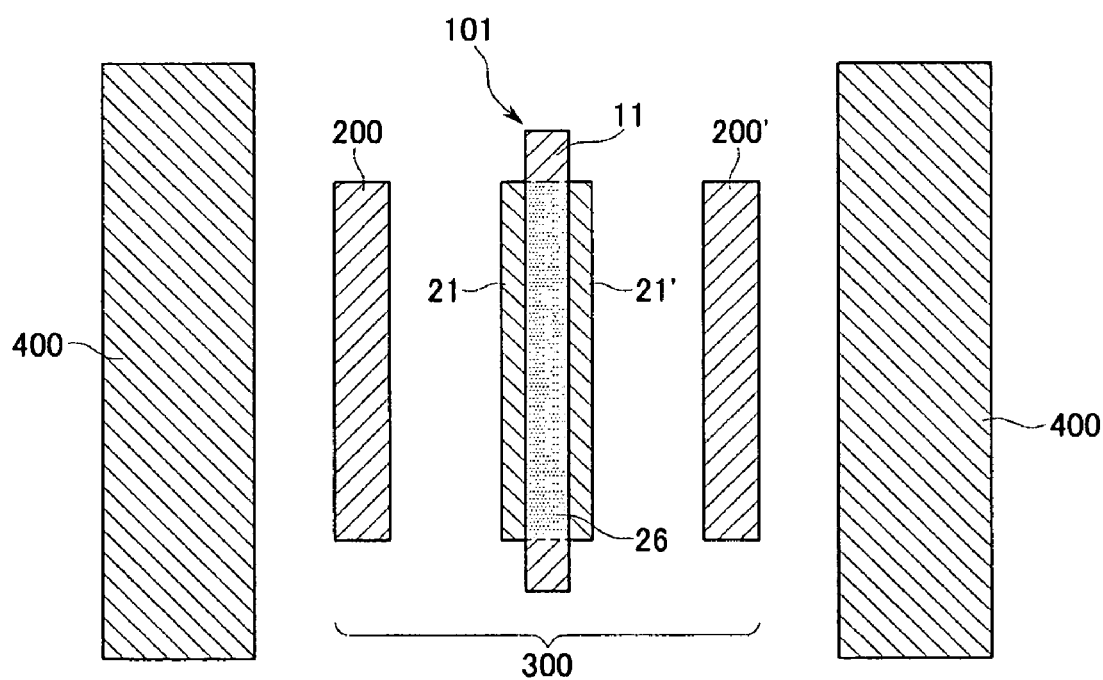
FIG. 6 illustrates an electricity generating element of a fuel cell system in accordance with an embodiment of the present invention.

FIG. 6 shows a cross-section of one of a plurality of unit cells included in the electricity generating element 500. Each unit cell includes a membrane-electrode assembly (MEA) 300 which includes a polymer electrolyte membrane 101 for a fuel cell, a cathode 200 disposed on one side of the polymer electrolyte membrane 101, an anode 200' disposed on the other side of the polymer electrolyte membrane 101, and separators (bipolar plates) 400 disposed to contact the anode and the cathode. The unit cells can be used individually, or two or more unit cells may be stacked and electrically connected.

The following examples illustrate the present invention in more detail. However, it is understood that the present invention is not limited by these examples.

Example 1

The upper surface of a hygroscopic substrate was formed from a 50 μm-thick fabric treated with polyvinyl alcohol, and coated with a 5 wt % poly(perfluorosulfonic acid) solution (NAFION™, produced by the DuPont Company), and was dried to form a polymer electrolyte membrane, which included a proton conductive polymer at the inside and a 5 μm-thick proton conductive polymer membrane at one side of the hygroscopic substrate.

A cathode and an anode were prepared by forming a catalyst layer of carbon-supported 10 wt % platinum on a carbon cloth. Then, a membrane-electrode assembly (MEA) was prepared by disposing the cathode and the anode on both sides of the above-prepared polymer electrolyte membrane. Subsequently, a fuel cell was prepared by disposing separators on both sides of the MEA. The fuel cell was not provided with any humidifier.

Example 2

A polymer electrolyte membrane for a fuel cell including a proton conductive polymer at the inside and a 5 μm-thick proton conductive polymer membrane on one side of the hygroscopic substrate was prepared by spraying 10 parts by weight of silver particles onto one side of 100 parts by weight of the hygroscopic substrate, which was a 50 μm-thick fabric treated with polyvinylalcohol, to impart conductivity to the hygroscopic substrate, and coating the other side of the hygroscopic substrate with a 5 wt % poly(perfluorosulfonic acid) solution (NAFION™) and drying it. A fuel cell was prepared according to the same method as in Example 1 except that the conductive side was disposed to contact the anode.

Example 3

A fuel cell was prepared according to the same method as in Example 1, except that the polymer electrolyte membrane was prepared including the proton conductive polymer at the inside and including 5 μm-thick proton conductive polymer membranes on both sides of the hygroscopic substrate. The polymer electrolyte membrane was prepared by pouring 5 wt % poly(perfluorosulfonic acid) solution (NAFION™) into a mold frame, mounting a hygroscopic substrate that was a 50 μm-thick fabric treated with polyvinyl alcohol, again coating the upper side of the hygroscopic substrate with the 5 wt % poly(perfluorosulfonic acid) solution (NAFION™) and drying the poly(perfluorosulfonic acid) solution.

Example 4

A fuel cell was prepared according to the same method as in Example 1, except that the polymer electrolyte membrane including a proton conductive polymer membrane on one side of the hygroscopic substrate was prepared by coating a 50 μm-thick poly(perfluorosulfonic acid) NAFION™ 112 membrane (produced by the DuPont Company) with a 5 wt % poly(perfluorosulfonic acid) solution (NAFION™), mounting a hygroscopic substrate thereon, which was a 50 μm-thick fabric treated with polyvinyl alcohol, and drying the poly(perfluorosulfonic acid) solution.

Example 5

A fuel cell was prepared according to the same method as in Example 1, except that the polymer electrolyte membrane including the proton conductive polymer inside, a proton conductive polymer membrane on one side of a hygroscopic substrate, and a 5 μm-thick proton conductive polymer membrane on the other side of the hygroscopic substrate was prepared by coating a 50 μm-thick poly(perfluorosulfonic acid) NAFION™ 112 membrane with a 5 wt % poly(perfluorosulfonic acid) solution (NAFION™), mounting a hygroscopic substrate, which was a 50 μm-thick fabric treated with polyvinylalcohol, again coating the hygroscopic substrate with the 5 wt % poly(perfluorosulfonic acid) solution (NAFION™), and drying the poly(perfluorosulfonic acid) solution.

Example 6

A fuel cell was prepared according to the same method as in Example 1, except that the polymer electrolyte membrane including the proton conductive polymer inside and including proton conductive polymer membranes on both sides of a hygroscopic substrate was prepared by coating a 50 μm-thick poly(perfluorosulfonic acid) NAFION™ 112 membrane with a 5 wt % poly(perfluorosulfonic acid) solution (NAFION™), mounting a hygroscopic substrate, which was a 50 μM-thick fabric treated with polyvinyl alcohol, coating the hygroscopic substrate with the 5 wt % poly(perfluorosulfonic acid) solution (NAFION™), again mounting a 50 μm-thick poly(perfluorosulfonic acid) NAFION™ 112 membrane on the 5 wt % poly(perfluorosulfonic acid) solution, and drying.

Example 7

A polymer electrolyte membrane and a fuel cell were prepared according to the same method as in Example 2, except that the hygroscopic substrate included 10 parts by weight of $SiO_2$ based on 100 parts by weight of the hygroscopic substrate which was a 50 μm-thick fabric treated with polyvinylalcohol.

Example 8

A polymer electrolyte membrane and a fuel cell were prepared according to the same method as in Example 2, except that the hygroscopic substrate included 5 parts by weight of a platinum catalyst based on 100 parts by weight of the hygroscopic substrate which was a 50 μm-thick fabric treated with polyvinylalcohol.

Example 9

A polymer electrolyte membrane and a fuel cell were prepared according to the same method as in Example 2, except that the hygroscopic substrate included 5 parts by weight of $SiO_2$ and 5 parts by weight of a platinum catalyst based on 100 parts by weight of the hygroscopic substrate, which was a 50 μm-thick fabric treated with polyvinylalcohol.

Comparative Example 1

A fuel cell was prepared according to the same method as in Example 1, except that a 170 μm-thick poly(perfluorosulfonic acid) membrane (NAFION™ 117 membrane), was used as a polymer electrolyte membrane for the fuel cell.

The fuel cell prepared in Example 2 was operated at 60° C. under a non-humidifying condition, and the current-voltage characteristics were measured at 10 minutes, 1 hour, and 2 hours.

Figure 7:
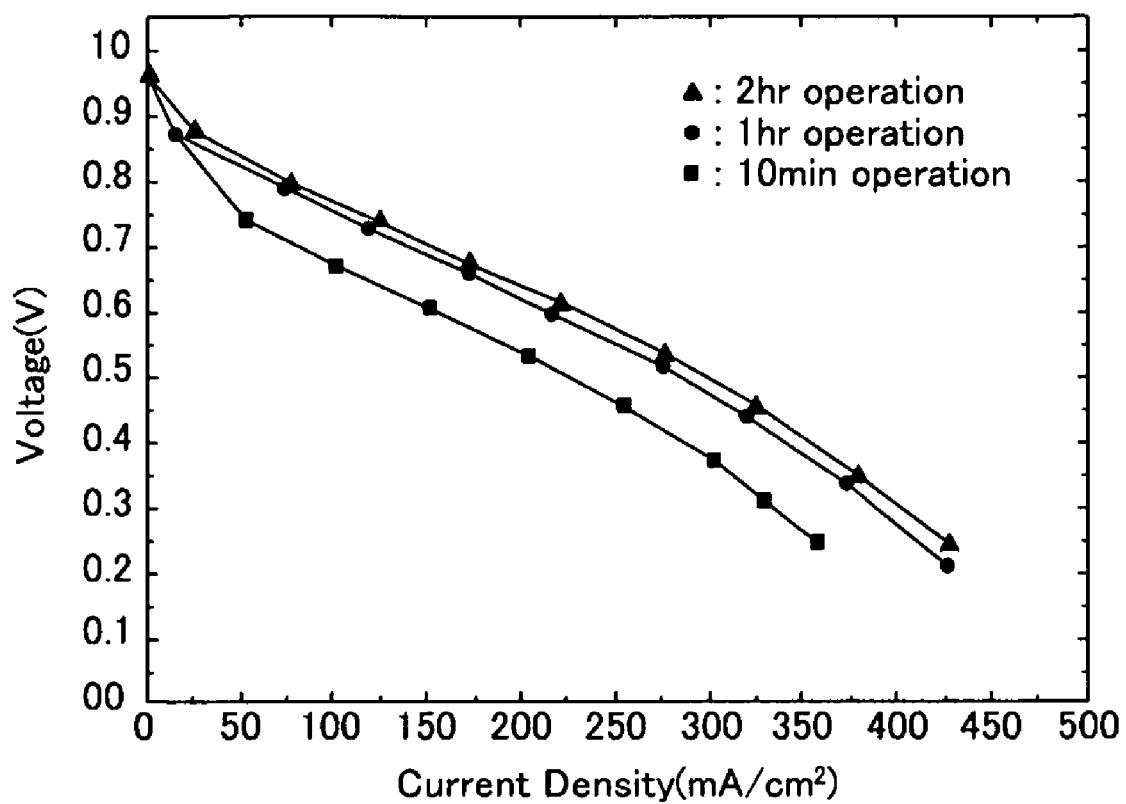
FIG. 7 is a graph showing the current-voltage characteristics of a non-humidified fuel cell prepared according to Example 2 of the present invention.

The results are shown in FIG. 7. As shown in FIG. 7, the fuel cell prepared according to Example 2 of the present invention showed very similar battery performance under the non-humidifying condition, even after a long time had passed.

Figure 8:
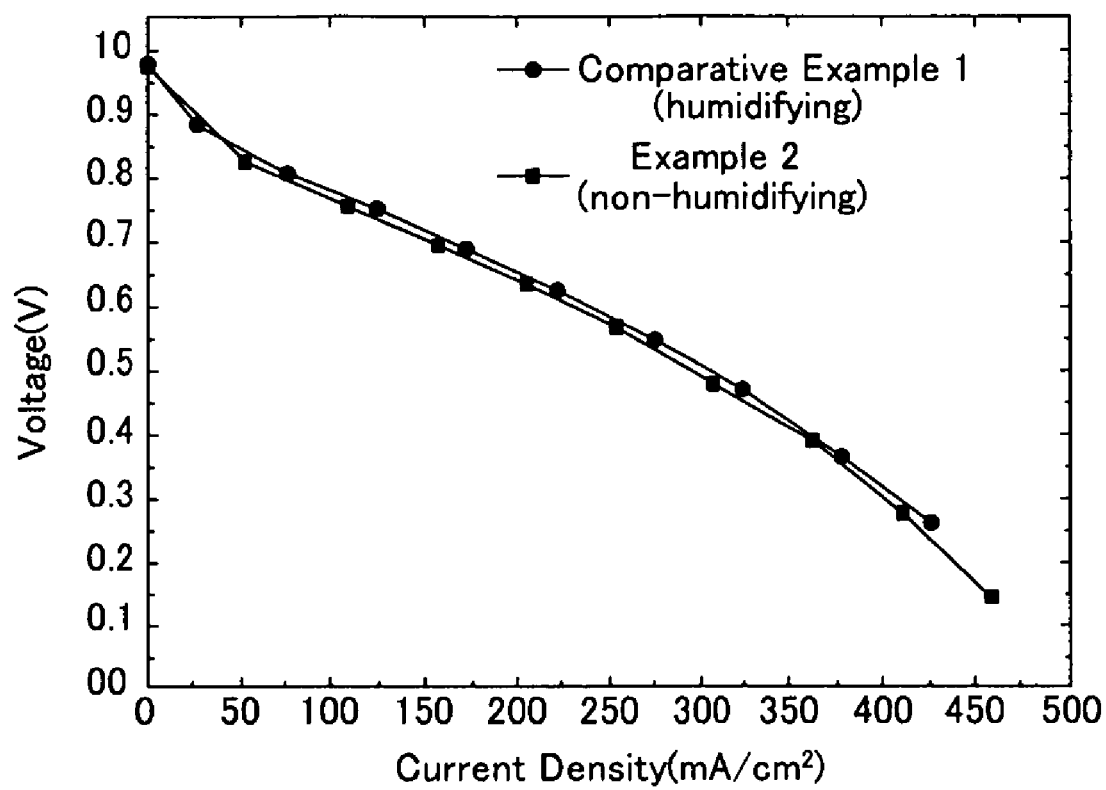
FIG. 8 is a graph comparing the current-voltage characteristic of the non-humidified fuel cell prepared according to Example 2 with the current-voltage characteristic of the humidified fuel cell prepared according to Comparative Example 1.

Also, the current-voltage characteristics of the fuel cell of Example 2 under the non-humidifying condition were compared with the current-voltage characteristics of the fuel cell of Comparative Example 1 under the humidifying condition. The comparison results are shown in FIG. 8. The other measurement conditions were maintained at 60° C. for 48 hours.

As shown in FIG. 8, the fuel cell prepared in Example 2 of the present invention showed equal current-voltage characteristics to the fuel cell under the humidifying condition, even though it was in the non-humidifying condition.

The polymer electrolyte membrane for a fuel cell of the present invention absorbs water generated in the fuel cell to self-humidify the fuel cell. Also, the hygroscopic substrate enhances the physical strength. Therefore, the polymer electrolyte membrane for a fuel cell can be applied to a self-humidifying fuel cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims

What is claimed is:

1. A polymer electrolyte membrane for a fuel cell, comprising:
   a hygroscopic substrate comprising at least one hydrophilic compound selected from the group consisting of sodium salts of alkynic acids, and combinations thereof; and
   a proton conductive polymer disposed at one or more of the inside, one side, and both sides of the hygroscopic substrate.

2. The polymer electrolyte membrane of claim 1, wherein the hygroscopic substrate is selected from woven fabrics, porous films, and non-woven fabrics.

3. The polymer electrolyte membrane of claim 1, wherein the hygroscopic substrate has a thickness from 10 to 200 μm.

4. The polymer electrolyte membrane of claim 1, wherein the hygroscopic substrate further comprises a hygroscopic agent comprising an inorganic oxide selected from the group consisting of zeolite, inorganic silicate, $TiO_2$, $SiO_2$, $RuO_2$, and combinations thereof.

5. The polymer electrolyte membrane of claim 4, wherein 100 parts by weight of the hygroscopic substrate includes 1 to 50 parts by weight of the hygroscopic agent.

6. A polymer electrolyte membrane for a fuel cell, comprising:
   a hygroscopic substrate comprising at least one hydrophilic compound and a hygroscopic agent comprising an inorganic oxide selected from the group consisting of zeolite, inorganic silicate, $TiO_2$, $SiO_2$, $RuO_2$, and combinations thereof;
   a proton conductive polymer disposed at the inside, and coated on a first side of the hygroscopic substrate; and
   electroconductive nano particles selected from the group consisting of nano metal particles and nano carbon particles coated on a second side of the hygroscopic substrate.

7. The polymer electrolyte membrane of claim 6, wherein the amount of the hygroscopic agent is from 1 to 50 parts by weight, and the amount of the electroconductive nano particles is from 1 to 15 parts by weight based on 100 parts by weight of the hygroscopic substrate.

8. The polymer electrolyte membrane of claim 1, wherein the hygroscopic substrate further comprises at least one metal catalyst selected from the group consisting of platinum, ruthenium, osmium, platinum-ruthenium alloys, platinum-osmium alloys, platinum-palladium alloys, platinum-M alloys, and combinations thereof, where M is selected from the group consisting of Ga, Ti, V, Cr, Mn, Fe, Co, Ni, Cu, Zn, and combinations thereof.

9. The polymer electrolyte membrane of claim 8, wherein the amount of the catalyst is from 1 to 20 parts by weight based on 100 parts by weight of the hygroscopic substrate.

10. The polymer electrolyte membrane of claim 1, wherein the proton conductive polymers are disposed at both sides of the hygroscopic substrate and comprise membranes not thicker than 50 μm, individually.

11. The polymer electrolyte membrane of claim 1, wherein the proton conductive polymer comprises a polymer selected from the group consisting of perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

12. The polymer electrolyte membrane of claim 11, wherein the proton conductive polymer comprises a polymer selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly (2,5-benzimidazole), and combinations thereof.

13. The polymer electrolyte membrane of claim 1, wherein the polymer electrolyte membrane has a thickness ranging from 10 to 300 μm.

14. A fuel cell system comprising:
   an electricity generating element comprising:
      a membrane-electrode assembly which comprises a polymer electrolyte membrane including a hygroscopic substrate comprising at least one hydrophilic compound selected from the group consisting of sodium salts of alkynic acids, and combinations thereof, and a proton conductive polymer disposed at least one of the inside, one side, and both sides of the hygroscopic substrate, a cathode disposed on one side of the polymer electrolyte membrane, and an anode disposed on the other side of the polymer electrolyte membrane, and
      separators disposed to contact the cathode and anode of the membrane-electrode assembly, respectively;
   a fuel supplier; and
   an oxidant supplier.

\* \* \* \* \*

UNITED STATES PATENT AND TRADEMARK OFFICE
CERTIFICATE OF CORRECTION

| | | |
|---|---|---|
| PATENT NO. | : 7,803,495 B2 | Page 1 of 1 |
| APPLICATION NO. | : 11/341933 | |
| DATED | : September 28, 2010 | |
| INVENTOR(S) | : Myoung-Ki Min et al. | |

It is certified that error appears in the above-identified patent and that said Letters Patent is hereby corrected as shown below:

In the Claims

| | |
|---|---|
| Column 12, Claim 14, line 46 | Before "least" Insert -- at -- |

Signed and Sealed this
Thirty-first Day of January, 2012

David J. Kappos
*Director of the United States Patent and Trademark Office*